United States Patent
Polewarczyk et al.

(10) Patent No.: US 10,577,851 B2
(45) Date of Patent: Mar. 3, 2020

(54) AUTOMATIC CLOSURE SYSTEM WITH ACTIVE DISTANCE CONTROL

(71) Applicant: GM GLOBAL TECHNOLOGY OPERATIONS LLC, Detroit, MI (US)

(72) Inventors: Joseph M. Polewarczyk, Rochester Hills, MI (US); Daniel R. Hunt, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 15/623,980

(22) Filed: Jun. 15, 2017

(65) Prior Publication Data

US 2018/0363357 A1  Dec. 20, 2018

(51) Int. Cl.
*B62D 25/00* (2006.01)
*E05F 15/73* (2015.01)
*E05F 15/40* (2015.01)
*B60J 5/10* (2006.01)

(52) U.S. Cl.
CPC ............... *E05F 15/73* (2015.01); *B60J 5/101* (2013.01); *E05F 15/40* (2015.01); *E05F 2015/765* (2015.01); *E05F 2015/767* (2015.01); *E05Y 2900/546* (2013.01); *E05Y 2900/548* (2013.01)

(58) Field of Classification Search
CPC ..... E05F 15/73; E05F 15/40; E05F 2015/767; E05F 2015/765; B60J 5/101; E05Y 2900/548; E05Y 2900/546
USPC .......................................................... 296/56
See application file for complete search history.

(56) References Cited

U.S. PATENT DOCUMENTS

| | | | | |
|---|---|---|---|---|
| 7,686,378 B2 * | 3/2010 | Gisler | ..................... | E05F 15/43 |
| | | | | 296/146.4 |
| 9,605,471 B2 * | 3/2017 | Salter | ...................... | E05F 15/73 |
| 10,126,455 B2 * | 11/2018 | Pirchheim | ........... | B60R 25/2054 |
| 10,329,829 B2 * | 6/2019 | Matsui | ..................... | E05F 15/73 |
| 2001/0033086 A1 * | 10/2001 | Yuge | ........................ | B60J 5/106 |
| | | | | 296/56 |
| 2012/0158253 A1 * | 6/2012 | Kroemke | ............ | B60R 25/2054 |
| | | | | 701/49 |
| 2012/0277958 A1 * | 11/2012 | Trombke | ................ | E05F 15/70 |
| | | | | 701/48 |

(Continued)

FOREIGN PATENT DOCUMENTS

WO     WO-2017042391 A1 *  3/2017  .............. B60J 5/106

*Primary Examiner* — Jerry E Redman

(57) ABSTRACT

An automotive vehicle includes a closure frame defining an opening, and a closure for selectively covering the opening. The closure has a plurality of positions including a closed position, an open position, and an intermediate position between the closed position and the open position. The vehicle also includes an actuator configured to move the closure among the plurality of positions. The vehicle additionally includes an optical sensor disposed proximate the closure. The vehicle further includes a controller. The controller is configured to automatically control the actuator to move the closure from the closed position to the open position in response to a closure open request and no feature being detected by the optical sensor, and to automatically control the actuator to move the closure from the closed position to the intermediate position in response to a closure open request and a feature being detected by the optical sensor.

5 Claims, 3 Drawing Sheets

(56) References Cited

U.S. PATENT DOCUMENTS

| | | | |
|---|---|---|---|
| 2015/0009062 A1* | 1/2015 | Herthan | E05B 83/16 342/70 |
| 2015/0019085 A1* | 1/2015 | Ma | G01S 13/931 701/49 |
| 2015/0025751 A1* | 1/2015 | Sugiura | B60J 5/06 701/49 |
| 2016/0083995 A1* | 3/2016 | Dezorzi | E05F 15/73 340/5.72 |
| 2016/0186480 A1* | 6/2016 | Krauss | B60R 25/2054 701/49 |
| 2017/0080785 A1* | 3/2017 | Azarko | G06F 3/0416 |
| 2017/0166166 A1* | 6/2017 | Lindic | B60R 25/24 |
| 2017/0166167 A1* | 6/2017 | Heller | B60R 25/24 |
| 2017/0249797 A1* | 8/2017 | Elie | G07F 17/0057 |
| 2017/0328115 A1* | 11/2017 | Matsui | B60R 13/00 |
| 2017/0342758 A1* | 11/2017 | Grudzinski | E05F 15/616 |
| 2017/0342761 A1* | 11/2017 | Conner | E05F 15/622 |
| 2018/0114388 A1* | 4/2018 | Nagler | B60R 9/042 |
| 2018/0238099 A1* | 8/2018 | Schatz | E05F 15/611 |
| 2018/0291664 A1* | 10/2018 | Felix Frias | B60J 1/004 |
| 2018/0297519 A1* | 10/2018 | Singh | B60Q 9/005 |
| 2019/0055767 A1* | 2/2019 | Pignard | B60J 5/106 |
| 2019/0128040 A1* | 5/2019 | Mitchell | E05F 15/40 |
| 2019/0145151 A1* | 5/2019 | Iikawa | E05F 15/73 |

* cited by examiner

AUTOMATIC CLOSURE SYSTEM WITH ACTIVE DISTANCE CONTROL

TECHNICAL FIELD

The present disclosure relates to automotive vehicles, and more particularly to automatic closure systems for automotive vehicles.

INTRODUCTION

Vehicles are generally provided with closures to allow for entry and exit to the vehicle, while also protecting vehicle contents during a drive cycle. Closures are generally mounted on the body and pivotable between open and closed positions. Example closures include driver doors, passenger doors, and rear lift gates. The size, geometry, and location of a given closure may vary based on the vehicle platform and purpose of the closure.

SUMMARY

An automotive vehicle according to the present disclosure includes a closure frame defining an opening to the vehicle, and a closure arranged relative the closure frame to selectively cover the opening. The closure has a plurality of positions including a closed position, an open position, and an intermediate position between the closed position and the open position. The vehicle also includes an actuator configured to move the closure among the plurality of positions. The vehicle additionally includes an optical sensor disposed proximate the closure and configured to capture video images. The vehicle further includes a controller. The controller is configured to automatically control the actuator to move the closure from the closed position to the open position in response to a closure open request and no feature being detected by the optical sensor. The controller is also configured to automatically control the actuator to move the closure from the closed position to the intermediate position in response to a closure open request and a feature being detected by the optical sensor.

In an exemplary embodiment, the controller is further configured to determine a feature height associated with the feature, and the location of the intermediate position relative to the open position and the closed position is based on the feature height. In such embodiments, the controller may be further configured to classify the feature as a person, and in response to the feature being classified as a person, the location of the intermediate position corresponds to a closure height being a predefined distance above the feature height.

In an exemplary embodiment, the optical sensor includes a backup camera disposed on the closure.

A method of controlling a vehicle according to the present disclosure includes providing a vehicle with a closure for to selectively covering an opening, an actuator configured to move the closure among a plurality of positions, at least one optical sensor disposed proximate the closure and configured to sense a region proximate the closure, and at least one controller in communication with the actuator and the at least one sensor. The method additionally includes detecting, via the at least one sensor, a detected feature proximate the closure. The method also includes classifying, via the at least one controller, the detected feature as a person or an object. The method further includes controlling the actuator, via the at least one controller, to open the closure. The controller controls the actuator to open the closure to a first height in response to a closure open signal and a person being detected proximate the closure, to open the closure to a second height in response to a closure open signal and an object being detected proximate the closure, and to open the closure to a third height in response to a closure open signal and no person or object being detected proximate the closure. The first height, second height, and third height are distinct from one another.

In an exemplary embodiment, providing a vehicle with at least one sensor includes providing the vehicle with an optical sensor. In such embodiments, providing the vehicle with an optical sensor may include providing the vehicle with a backup video camera.

In an exemplary embodiment, in response to the detected feature being classified as a person, the first height corresponds to a predefined distance above a detected height of the detected feature.

In an exemplary embodiment, in response to the detected feature being classified as an object, the second height corresponds to a predefined distance below a detected height of the detected feature.

In an exemplary embodiment, in response to the detected feature being classified as an object, the detected feature is classified as an object above the vehicle or an object behind the vehicle. In response to the detected feature being classified as an object behind the vehicle, a lateral distance may be determined from the vehicle to the detected feature, and in response to the lateral distance being below a predefined threshold, the second height may correspond to a fully closed position.

In an exemplary embodiment, the third height corresponds to a fully open position.

A controller according to the present disclosure is programmed to receive a closure open signal, receive sensor data from at least one optical sensor, process the sensor data to identify a feature; and classify the feature as a person or an object. In response to the closure open signal and a feature being classified as a person, the controller automatically controls an actuator to open a closure to a first height. In response to the closure open signal and a feature being classified as a person, the controller automatically controls an actuator to open a closure to a second height, which is distinct from the first height. In response to the closure open signal and no feature being identified, the controller automatically controls an actuator to open a closure to a third height, which is distinct from the first height and from the second height.

Embodiments according to the present disclosure provide a number of advantages. For example, the present disclosure provides a system and method for automatically controlling a vehicle closure to a desired height when a user is proximate the closure, thereby ensuring head clearance and enabling easy closing of the closure. In addition, the closure may avoid colliding with objects during automatic opening. Moreover, these functions may be performed using sensors already present on many vehicles, such as a backup camera.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Figure 1:
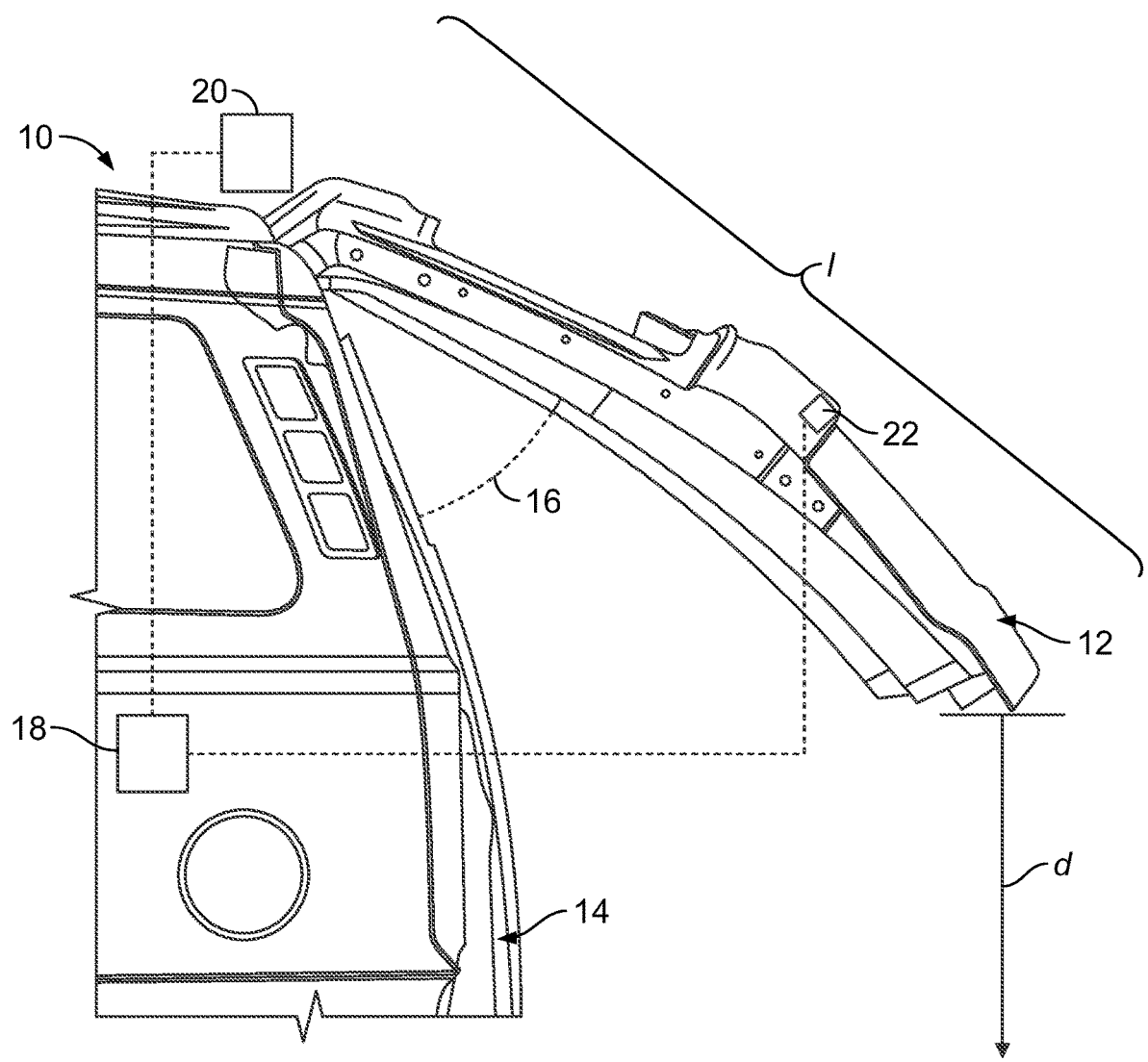
FIG. 1 illustrates an automotive vehicle according to the present disclosure.

Referring now to FIG. 1, a partial, schematic side-view of a vehicle 10 according to the present disclosure is illustrated. The vehicle 10 includes a closure 12 pivotably coupled to a closure frame 14. The closure 12 is illustrated in a partially open position in FIG. 1, having an opening angle 16 defined by the position of the closure 12 relative to the closure frame 14. A closure opening distance d is defined by the opening angle 16 and a length l of the closure. In this embodiment, the closure 12 is a vertically-opening lift gate for an SUV or van, and the opening distance d refers to a vertical height from the closure 12 to the ground. However, other embodiments may include horizontally-opening closures such as a vehicle door. In such embodiments, the distance may refer to a horizontal distance between the closure and the closure frame.

Although not shown in detail, the closure 12 is pivotably mounted on the closure frame 14, e.g. with a hinge. The closure 12 may include a shell defined by inner and outer panels that enclose various components of the closure 12 and may further include one or more windows and window frames. In addition, the closure 12 may include a latching mechanism to secure the closure 12 in a closed position, to initiate opening, or both. Generally, the closure frame 14 refers to a portion of the vehicle body that defines an opening and cooperates or mates with the closure 12 to selectively provide access or seal that opening. In the depicted exemplary embodiment, the closure frame 14 corresponds to a D-pillar, although in other embodiments, the closure frame 14 may refer to other portions of the body.

The vehicle 10 additionally includes at least one controller 18, an actuation unit 20, and at least one optical sensor 22. The controller 18, actuation unit 20, and optical sensor 22 may be operatively coupled together in any suitable manner, including in a wired or wireless configuration. In one exemplary embodiment, the controller 18, actuation unit 20, and optical sensor 22 may communicate with an appropriate short range wireless data communication scheme, such as IEEE Specification 802.11 (Wi-Fi), WiMAX, the BLUETOOTH™ short range wireless communication protocol, a Dedicated Short Range Communication (DSRC) system, or the like, including cellular communications.

Although not shown, the controller 18, actuation unit 20, and optical sensor 22 may be coupled to a power source, such as a vehicle battery, and may be incorporated into or otherwise cooperate with other vehicle systems.

The controller 18 is generally configured to carry out the functions described below, including controlling operation of the actuation unit 20 and optical sensor 22. As such, the controller 110 generally represents the hardware, software, and/or firmware components configured to facilitate operation. In one exemplary embodiment, the controller 18 may be an electronic control unit (ECU) of the vehicle. Depending on the embodiment, the controller 18 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof. In practice, the controller 18 includes processing logic stored in memory that may be configured to carry out the functions, techniques, and processing tasks associated with the operation of the vehicle 10.

In some embodiments, the controller 18 may be associated with a user interface that enables a user to interact with the vehicle 10. Any suitable user interface may be provided, including a touch screen and/or combination of buttons and switches. In one exemplary embodiment, the user interface enables the user to disable or enable functions of the controller 18. In further embodiments, the user interface enables the user to define the conditions and consequences upon detection of an obstacle, as described in greater detail below. In other embodiments, the ability to make such selections may be omitted, e.g., to prevent a user from inadvertently disabling functions of the controller 18.

The actuation unit 20 is configured to actuate the opening and closing of the closure. As such, the actuation unit 20 may include a motor that selectively assists or drives the closing or opening of the closure based on commands from the controller 18. To control movement of the closure, the actuation unit 20 may include any suitable coupling components, including fluid, magnetic, friction, and/or electric devices. In some embodiments, the actuation unit 20 may be associated with a user interface, such as a door handle, button, or a key fob remote, that enables the user to command the opening and closing of the closure via the controller 18. The actuation unit 20 may also detect or determine position information regarding the closure 12, including the opening angle 16, and provide this position information to the controller 18.

The optical sensor 22 includes a video camera for capturing video images. The optical sensor 22 is arranged on or near the closure 12 and has a field of view that encompasses a region in the vicinity of the closure 12. In the embodiment illustrated in FIG. 1, the optical sensor may be referred to as a backup camera, configured to capture video images of a region behind the vehicle 10 to aid a driver when the vehicle 10 is moving backward. However, in other embodiments with other closures such as a vehicle door, the optical sensor 22 may be arranged to capture other regions of the proximate the vehicle 10.

Figure 2:
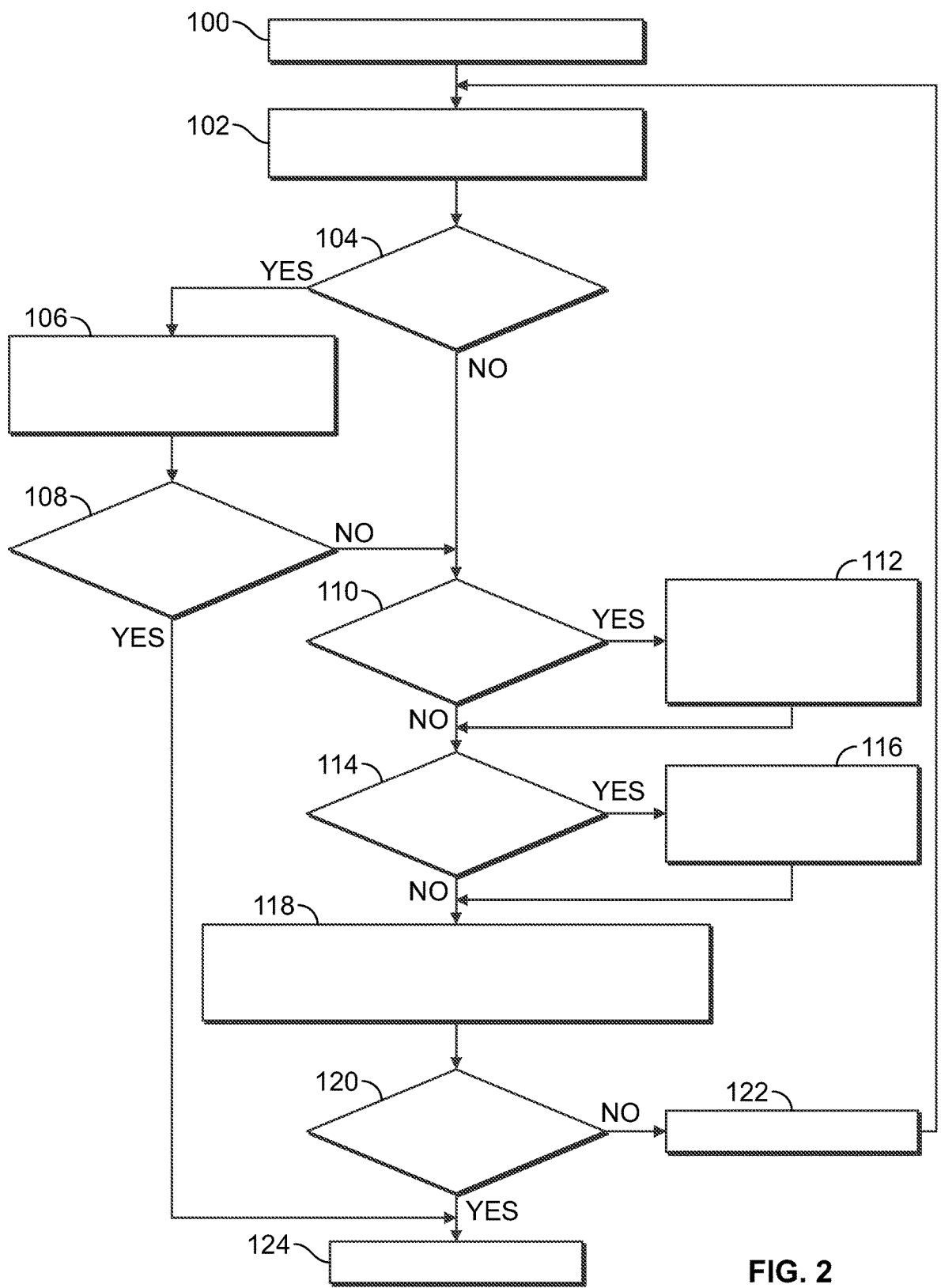
FIG. 2 is a flowchart illustrating a method for controlling a vehicle according to the present disclosure.

Referring now to FIG. 2, a method of controlling a vehicle according to the present disclosure is illustrated in flowchart form.

A closure open request is received, as illustrated at block 100. In an exemplary embodiment, the closure request is initiated by a user, e.g. via door handle, button, or key fob remote as discussed above. However, in autonomous vehicle embodiments, a closure open request may be initiated automatically by an automated driving system or other controller in response to various inputs.

Signals from at least one sensor are received and processed, as illustrated at block 102. In an exemplary embodiment, the sensor includes the optical sensor 22. However, signals from additional sensors may also be received and processed. As an example, signals from sensors in other locations on the vehicle, sensors other than optical sensors, or both may be received and processed, e.g. to provide an increased field of view or improved resolution. In an exemplary embodiment the signals are received and processed by the controller 18. However, additional or other controllers may perform at least a portion of the processing. The signals may be processed according to various known computer vision algorithms to identify features in the vicinity of closure 12.

Figure 3:
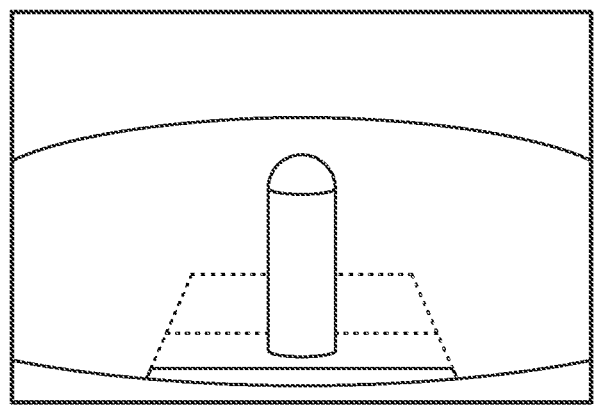
FIG. 3 is a first representation of a view from a vehicle camera system.

A determination is made of whether an object is detected behind the vehicle, as illustrated at operation 104. Here, object refers to any detected feature, aside from any detected people, aftward of the vehicle which may obstruct full opening of the closure 12. As an example, an object detected behind the vehicle may refer to a detected feature projecting from the ground, such as a post or wall, as illustrated in FIG. 3.

If the determination of operation 104 is positive, e.g. a feature is detected aftward of the vehicle, then a lateral distance to the object is determined and stored, as illustrated at block 106. The lateral distance refers to a distance from an aftmost point on the vehicle to detected object. The distance may be determined using known computer vision techniques, as discussed above, and subsequently stored in nontransient data memory. In an exemplary embodiment, an offset is also provided and added to the determined height $h_P$, as also illustrated at block 106. The offset is preferably selected to provide a safety margin and may be, for example, in the range of 2-6 inches.

A determination is then made of whether the object is within a distance l of the vehicle, i.e. if the stored lateral distance and offset, if any, is less than l, as illustrated at operation 108. As discussed above, l corresponds to the length of the closure. Any object within the distance l of the aftward portion of the vehicle may therefore obstruct opening of the closure.

If the determination of operation 108 is positive, then the actuation unit 20 is controlled to stop opening the closure 12, as illustrated at block 124. The closure is thereby controlled to avoid colliding with any detected objects aft of the vehicle.

If the determination of operation 108 is negative, then control proceeds to operation 110. Likewise, if the determination of operation 104 is negative, then control proceeds to operation 110.

Figure 4:
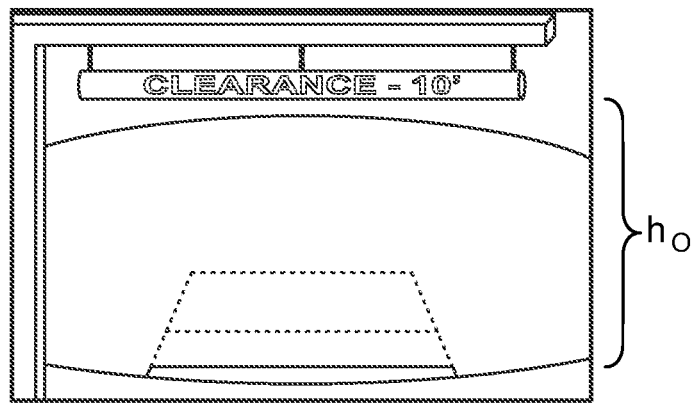
FIG. 4 is a second representation of a view from a vehicle camera system.

A determination is made of whether an object is detected above the closure 12, as illustrated at operation 110. Here, object refers to any detected feature, above the closure which may obstruct full opening of the closure 12, such as an overhang as illustrated in FIG. 4.

If the determination of operation 110 is positive, i.e. an object is detected above the closure 12, then a height $h_O$ associated with the object is determined and stored, as illustrated at block 112. As illustrated in FIG. 4, the height $h_O$ of the object refers to a vertical distance from the ground to a lowermost detected edge of the object. In an exemplary embodiment, an offset is also provided and subtracted from the determined height $h_O$, as also illustrated at block 112. The offset is preferably selected such that the difference of $h_O$ and the offset corresponds to a height at which the closure will not collide with the object. The offset may be, for example, in the range of 2-6 inches.

Control then proceeds to operation 114. Likewise, if the determination of operation 104 is negative, control proceeds to operation 114.

A determination is made of whether a person is detected in the vicinity of the closure 12, as illustrated at operation 114. In an exemplary embodiment, this determination is based on whether a person is detected within a predefined range of the closure 12. The predefined range may be, for example, based on the length l of the closure.

Figure 5:
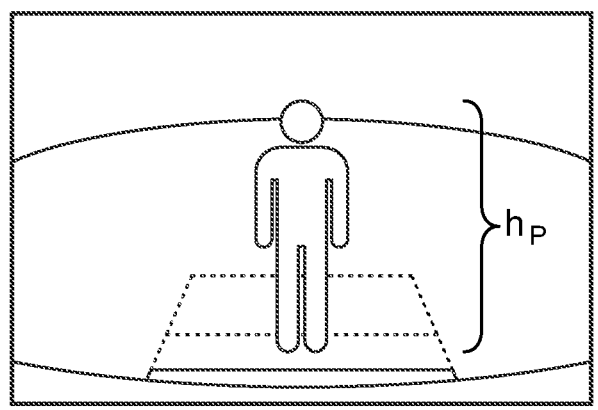
FIG. 5 is a third representation of a view from a vehicle camera system.

If the determination of operation 114 is positive, e.g. a person is detected in the vicinity of the closure 12, then a height $h_P$ of the person is determined and stored, as illustrated at block 116. As illustrated in FIG. 5, the height $h_P$ of the person refers to a vertical distance from the ground to an uppermost detected portion of the person. In an exemplary embodiment, an offset is also provided and added to the determined height $h_P$, as also illustrated at block 116. The offset is preferably selected such that the sum of $h_P$ and the offset corresponds to a height at which the detected person will not collide with the closure, but at which the detected person may still easily reach the closure to grasp or close it. The offset may be, for example, in the range of 2-6 inches.

Control then proceeds to operation 118. Likewise, if the determination of operation 104 is negative, control proceeds to operation 118.

A target opening distance $d_{target}$ is set, as illustrated at block 118. The target opening distance is set to the minimum value among $h_P$, $h_O$, and a maximum opening distance associated with the closure, as also illustrated at block 118. The maximum opening distance refers to the greatest opening distance to which the actuation unit 20 is configured to open the closure 12. If $h_P$ or $h_O$ have no associated value, the respective height or heights with no associated value are removed from consideration, as also illustrated at block 118.

A determination is made of whether a current opening distance $d_{current}$ is greater than or equal to the target opening distance $d_{target}$, as illustrated at operation 120. If the determination is negative, i.e. the current opening distance is less than the target opening distance, then the actuation unit 20 is controlled to continue opening the closure 12, as illustrated at block 122. If the determination is positive, i.e. the current opening distance is at least equal to the target opening distance, then the actuation unit 20 is controlled to stop opening the closure 12, as illustrated at block 124.

While the above has been described primarily in conjunction with a liftgate having a backup camera, other embodiments within the scope of the present disclosure may apply to other types of closures, include other types of sensors, or both.

In an alternative embodiment, the algorithm may make no distinction between people and objects. In such embodiments, the controller may control the closure to open to a position based on the height of any detected feature in the vicinity of the closure. Such embodiments may be less flexible than others described herein, but may also have reduced processing requirements.

As may be seen, the present disclosure provides a system and method for automatically controlling a vehicle closure to a desired height when a user is proximate the closure, thereby ensuring head clearance and enabling easy closing of the closure. In addition, the closure may avoid colliding with objects during automatic opening. Moreover, these functions may be performed using sensors already present on many vehicles, such as a backup camera.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   a closure frame defining an opening to the vehicle;
   a closure arranged relative the closure frame to selectively cover the opening, the closure having a plurality of positions including a closed position, an open position, and an intermediate position between the closed position and the open position;
   an actuator configured to move the closure among the plurality of positions;
   at least one optical sensor disposed proximate the closure and configured to sense a region proximate the closure; and
   a controller configured to automatically control the actuator to move the closure from the closed position to the open position in response to a closure open request and no object or person being detected by the optical sensor, and to automatically control the actuator to move the closure from the closed position to the intermediate position in response to a closure open request and an object or person being detected by the optical sensor.

2. The automotive vehicle of claim 1, wherein the controller is further configured to determine a feature height associated with the object or person, and wherein a location of the intermediate position relative to the open position and the closed position is based on the feature height.

3. The automotive vehicle of claim 2, wherein the controller is further configured to classify the object or person as a person, and wherein in response to the object or person being classified as a person, the location of the intermediate position corresponds to a closure height being a predefined distance above the feature height.

4. The automotive vehicle of claim 2, wherein the controller is further configured to classify the object or person as an object above the vehicle, and wherein in response to the object or person being classified as an object above the vehicle, the location of the intermediate position corresponds to a closure height being a predefined distance below the object.

5. The automotive vehicle of claim 1, wherein the optical sensor includes a backup video camera disposed on the closure.

* * * * *